United States Patent [19]

Murakami

[11] 3,800,320

[45] Mar. 26, 1974

[54] TEMPORARY STOP DEVICE FOR CARTRIDGE TAPE PLAYER-RECORDER

[75] Inventor: Hajime Murakami, Iwaki, Japan

[73] Assignee: Alps Motorola, Inc., Tokyo, Japan

[22] Filed: Jan. 20, 1972

[21] Appl. No.: 219,353

[52] U.S. Cl. .......... 360/93

[51] Int. Cl. .......... G11b 25/06

[58] Field of Search .......... 274/4 R, 4 B, 11 B; 242/55.19 A, 198; 179/100.2 Z

[56] References Cited

UNITED STATES PATENTS

| | | | |
|---|---|---|---|
| 3,492,005 | 1/1970 | Veno et al. | 179/100.2 Z |
| 3,485,500 | 12/1969 | Loeschner et al. | 274/4 B |
| 3,460,733 | 8/1969 | Lane | 242/197 X |

*Primary Examiner*—Harry N. Haroian
*Attorney, Agent, or Firm*—Mueller, Aichele & Gillman

[57] ABSTRACT

A temporary stop device or pause mechanism for use in a tape cartridge player-recorder includes a spring biased manually operated lever arm movable in accordance with the depression and release thereof into and out of engagement with a spring biased cartridge engaging arm of a cartridge locking mechanism to urge a cartridge inserted into the tape player-recorder away from a tape driving capstan and magnetic tape head, thereby to discontinue momentarily the recording or playing process, depending upon the mode of operation of the player-recorder. The latter is accomplished without affecting the operation of the tape drive mechanism and magnetic tape head.

9 Claims, 5 Drawing Figures

TEMPORARY STOP DEVICE FOR CARTRIDGE TAPE PLAYER-RECORDER

BACKGROUND

This invention relates generally to cartridge type tape player-recorders and more particularly to apparatus therein for momentarily discontinuing the recording or playing process including the transporting of the tape through the cartridge, while maintaining the player-recorder in a functional state.

Often, during the recording of information with a cartridge type tape player-recorder, it becomes necessary or is desirable to discontinue the recording process momentarily to avoid the recordation of unwanted portions of the information. Often too, it may be desirable to discontinue momentarily the playing of prerecorded cartridges. It is necessary during the pause in the recording of playback process that the recording tape not be transported through the cartridge and it is advantageous that the player-recorder including the tape drive be maintained functional so that resumption of the process may be accomplished rapidly.

The latter, however, is difficult to provide in cartridge type tape player-recorders since more often than not there is a cartridge locking mechanism which serves to secure a tape cartridge in the player-recorder in engagement with the tape drive and magnetic tape head.

SUMMARY

Accordingly, it is a general object of the present invention to provide in a tape cartridge player-recorder, a temporary stop device or pause mechanism for momentarily discontinuing the recording or playing process including the transporting of the recording tape through the cartridge, while maintaining the player-recorder, including the tape drive, functional for rapid resumption of the process.

It is another object of the present invention to provide a temporary stop device of the above described type for use in a cartridge type tape player-recorder including a cartridge locking mechanism for maintaining the cartridge inserted into the player-recorder in engagement with the tape drive and magnetic tape head.

It is still another object of the invention to provide apparatus of the above described type which operates efficiently and in a simple manner, and which is simple in design and relatively inexpensive to fabricate.

Briefly, a preferred embodiment of the temporary stop device according to the invention includes a spring biased lever arm movable into and out of engagement with a spring biased arm of a cartridge locking mechanism used for securing the cartridge in the tape player-recorder with the tape in engagement with a drive capstan and magnetic tape head.

Depression on the lever arm forces it against the spring biased arm of the cartridge locking mechanism with sufficient force to move a slidable member into engagement with the tape cartridge to urge the cartridge away from the tape drive capstan shaft and tape head, thereby discontinuing the processing of information, i.e., recording or playing, including the movement of the tape through the cartridge.

The lever arm may be locked into the depressed position if desired by a sidewise movement thereof. Release of the lever arm permits the arm of the cartridge locking mechanism to return the cartridge to a fully inserted position.

DETAILED DESCRIPTION

Figure 1:
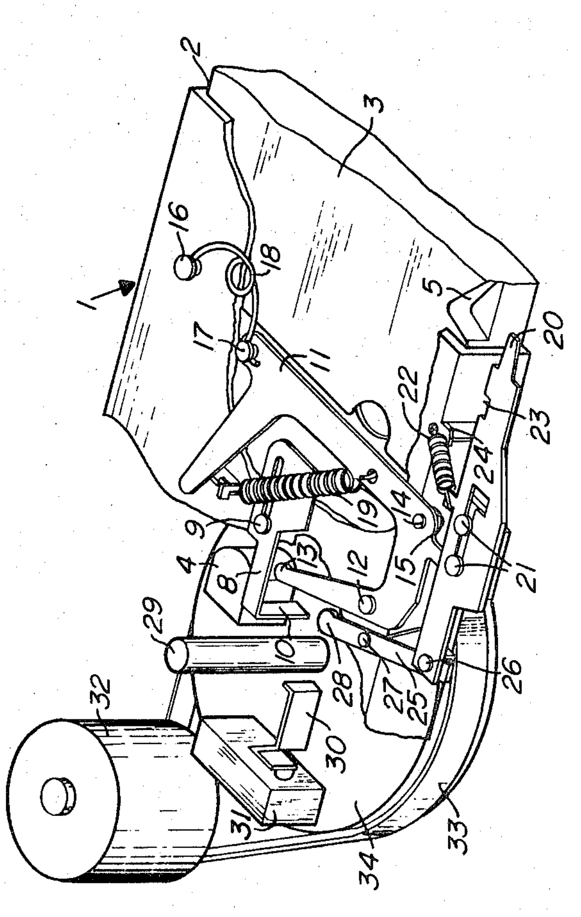
FIG. 1 is a perspective view of a cartridge type tape player-recorder including a temporary stop device or pause mechanism according to the invention.

Referring now to the drawings in greater detail wherein like numerals have been used to designate similar parts throughout the various views, in FIG. 1 thereof there is illustrated a tape player-recorder incorporating a temporary stop device or pause mechanism according to the invention.

Figure 3:
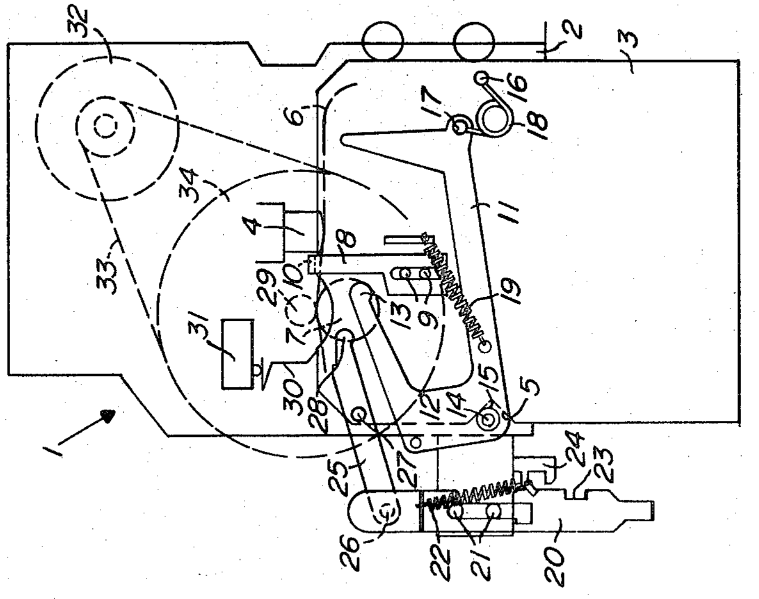
FIG. 3 is a plan view of the tape player-recorder of FIG. 1 as shown upon insertion of a tape cartridge thereinto.

In the drawings, numeral 1 designates the main body of the tape player-recorder. A tunnel 2 is provided therein for receipt of a tape cartridge 3. A magnetic tape head 4 is provided at the innermost end of the tunnel 2 for playing and recording information on a tape 6 in the cartridge 3. The cartridge 3 includes a notch or recess 5 formed along a side surface thereof. A pressure roller 7 provided in the cartridge and over which the tape 6 passes, holds the tape in engagement with the tape head 4 upon insertion of the cartridge into the tunnel 2, (See FIG. 3). Numeral 8 designates a slide member mounted for forward and rearward movement on supports 9. A bent portion of the slide member 8 extends downwardly into tunnel 2 for engagement with cartridge 3 upon insertion of the latter into tunnel 2.

Numeral 11 designates a C-shaped lever arm of a cartridge locking mechanism which is pivotally mounted on support 12 to the main body 1 of the tape player-recorder. One end 13 of the C-lever is disposed at a position abutting slide member 8 and includes a roller 15 mounted thereon by support 14 at a central corner portion of the C-lever for rotation with respect thereto. The roller is movable into and out of the tunnel 2 through an opening in the side wall thereof upon rotation of C-lever 11 about point 12. Numeral 16 designates a pin support on body 1 and 17 is a support provided on C-lever 11. An overcenter or snap-over spring 18 is coupled at opposite ends to supports 16, 17, respectively, to snap the C-lever to two stable positions in accordance with the insertion and withdrawal of a cartridge in tunnel 2. Coil spring 19 is an auxiliary spring which aids spring 18 upon pivoting C-lever 11 in a counterclockwise direction as seen in the drawings.

Figures 4A, 4B:
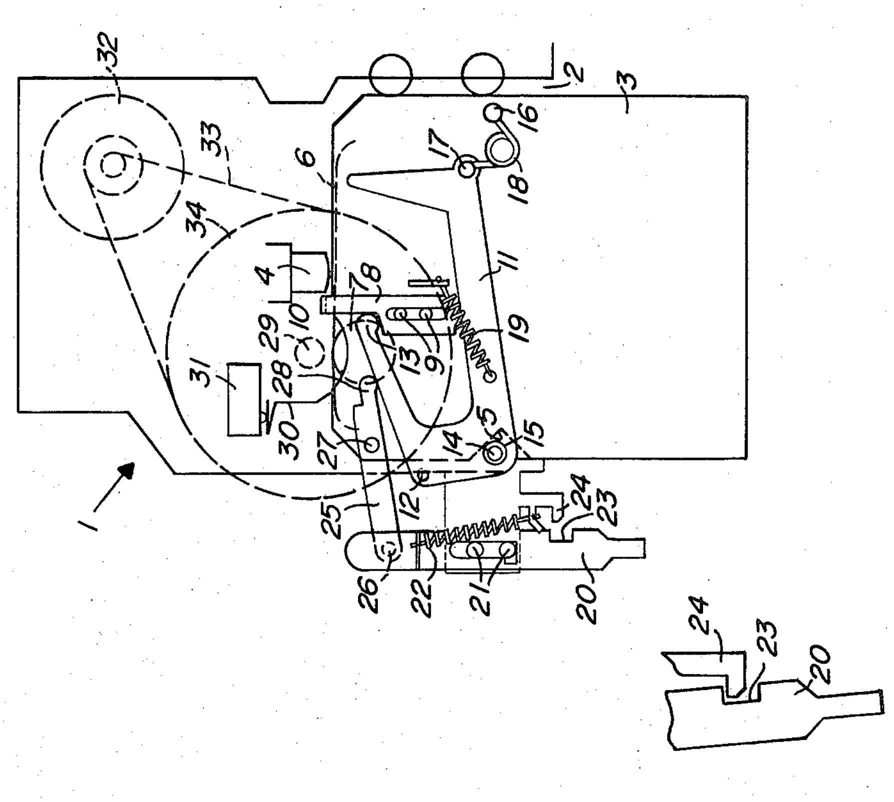
FIG. 4*a* is a plan view of the tape player-recorder of FIG. 1 illustrating the operation of the pause mechanism incorporated thereinto.
FIG. 4*b* is a fragmentary top plan view of a slide lever portion of the pause mechanism of FIG. 4*a* as it appears in a locked position.

The temporary stop device or pause mechanism includes a slide lever 20 mounted for sliding movement forward and rearward alongside tunnel 2 on supports 21. Spring 22 biases the slide lever to a forward position outwardly of the player-recorder. A recess 23 is provided in the edge of slide lever 20 to receive a projection 24 extending from the main body 1 of the player-recorder upon moving the slide lever inwardly (rearwardly) thereof and to the right as seen in the drawings, thereby to maintain the lever 20 in that position (See FIG. 4). The elongated opening in slide lever 20 through which supports 21 extend permit movement as described. Numeral 25 designates another lever arm connected pivotally at one end to slide lever 20 by support 26 and mounted for rotation about support 27 on body 1. The opposite or free end 28 of lever arm 25 is positioned in an abutting relation with C-lever 11.

A rotatable capstan shaft 29 provided on body 1 engages the tape 6 in a cartridge inserted into the player-recorder to drive the tape therethrough. When the cartridge 3 is inserted into tunnel 2, a lever 30 is engaged thereby to operate switch 31 fixed on body 1, to a closed position to in turn energize an electric drive motor 32. Rotation of a drive shaft of the motor turns flywheel 34 to which it is coupled by belt 35, and in turn rotates capstan shaft 29 which is mounted on the flywheel for rotation therewith.

Figure 2:
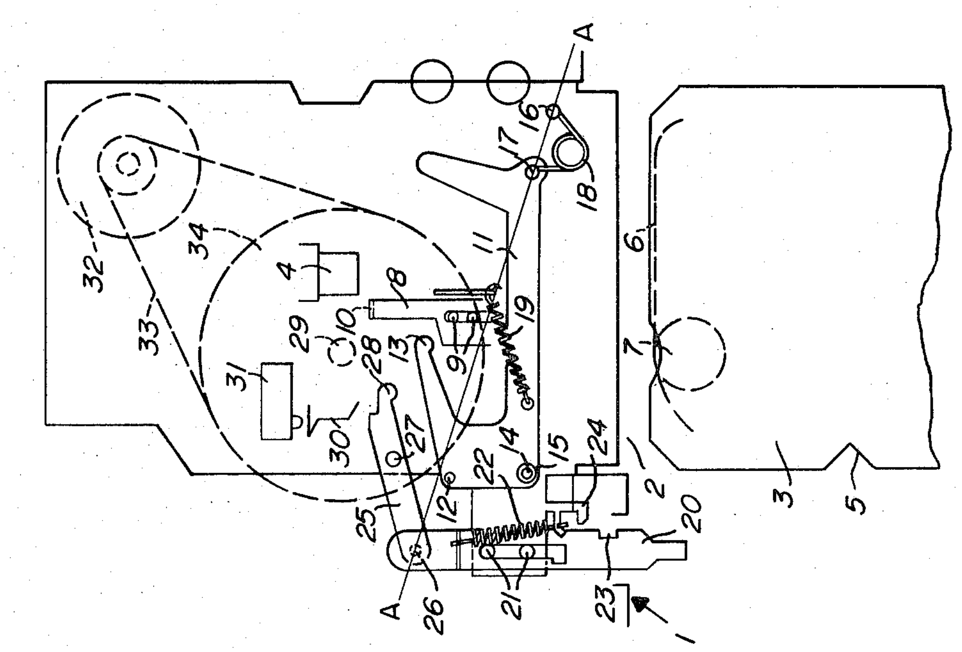
FIG. 2 is a plan view of the tape player-recorder of FIG. 1 as shown prior to the insertion of a tape cartridge thereinto.

In operation, prior to insertion of a cartridge into tunnel 2, the C-lever and temporary stop device are in a first state as shown in FIG. 2. Upon insertion of a cartridge 3 into tunnel 2, the cartridge engages piece 10 of slidable member 8 to advance the member inwardly toward the tape player-recorder. Movement of member 8 causes it to engage one end 13 of C-lever 11 whereupon the C-lever is rotated in a counterclockwise direction as seen in the drawings about point 12. As the end of the spring 18 attached to pin 17 moves past imaginary line A—A connecting pins 16 and support 12, the C-lever 11 is snapped from a first stable state to a second stable state by spring 18 and roller 15 is moved into tunnel 2 into engagement with the side surface of cartridge 3 and into recess 5 therein. The cartridge now assumes the position shown in FIG. 3. With the cartridge 3 in a fixed position, pressure roller 7 presses tape 6 against capstan shaft 29 and simultaneously therewith lever 30 is pressed to close switch 31 thereby to start drive motor 32. The rotation of shaft 29 rotates pressure roller 7 to transport the tape therebetween. Tape 6 also is in contacting relation with magnetic tape head 4.

To stop the movement of the tape through the cartridge and the recording or playing of information thereon while not turning off the motor and other tape processing instrumentalities of the tape player-recorder, the temporary stop device is operated.

Upon depression of slide lever arm 20 inwardly of the tap player-recorder against spring 22, the lever 25 is rotated in a clockwise direction to engage at end 28, C-lever 11. The C-lever is thereby also rotated clockwise about support 12. The end 13 of the C-lever engages slide member 8 to move it forward in the direction opposite of the insertion of cartridge 3. Portion 10 of the slide member 8 engages cartridge 3 to move the latter rearward in tunnel 2 so that pressure roller 7 is moved out of engagement with the rotating capstan shaft 29. Lever 30, however, remains engaged sufficiently to maintain switch 31 closed and motor 32 continues to drive capstan shaft 29. The snap-over spring 18 likewise is maintained in the second stable state. Since tape 6 no longer is moved through cartridge 3 and is no longer being moved past magnetic tape head 4, the processing of information (either recording or playing as the case may be) is stopped. To maintain the temporary stop device in the latter position without having to hold the lever 20 inwardly manually, the slide lever 20 is shifted sidewise, to the right as shown in the drawings, so that projection 24 is received in recess 23 in the slide lever arm 20, (See FIG. 4*b*). The last described movement maintains lever arm 20 in the depressed position.

To begin the processing of information once again, the slide lever 20 is shifted to the left to release it from projection 24 of body 1. Release of the slide lever arm 20 thereafter permits spring 22 to return it in a forward direction, and thereby to permit the cartridge to move back into an inserted position in tunnel 2.

Since upon operation of the pause mechanism switch 31 is maintained closed, the motor 32 continues to run. Thus, immediately upon release of the slide lever 20, the processing of information is resumed.

With the temporary stop device of the invention as described, when slide lever 20 is depressed, the cartridge 3 is moved out of the tunnel 2 by means of lever 25, the C-lever 11 and slide member 8, which releases the pressure on tape 6 by pressure roller 7 on capstan shaft 29 to stop the movement of the tape. Thus, the stopping of the tape is simple and it is performed independently of the rotation of shaft 29. Moreover, when the pressure on slide lever 20 is released, the tape is moved through the cartridge immediately without deformation of the pressure roller. Therefore, there is no possibility of causing "wow" due to the operation of the pause mechanism.

I claim:

1. In a cartridge type tape player-recorder including a tunnel for receiving tape cartridges, instrumentalities communicating with said tunnel for engaging and driving the tape through a cartridge inserted fully into said tunnel and for processing information on said tape, respectively, and a cartridge locking mechanism including resiliently biased means, engageable with a cartridge inserted fully into said tunnel for releasably securing said cartridge in said tunnel, a temporary stop device for momentarily discontinuing the processing including the driving of said tape through said cartridge while not disturbing the operation of said tape driving and information processing instrumentalities, said temporary stop device including means movable from a first to a second position into engagement with the cartridge engaging means of said cartridge locking mechanism, said movable means providing a force against the resiliently biased cartridge locking means sufficient to cause the last-mentioned means to urge said cartridge away from said tape driving and processing instrumentalities, said cartridge returning to a fully inserted position in said tunnel upon return of said arm member to said first position.

2. A cartridge type tape player-recorder as claimed in claim 1 wherein said cartridge locking means includes an arm member mounted for movement between first and second stable positions and spring means resiliently biasing said arm member into both said positions, and means engaging said cartridge upon the latter being received in said tunnel and wherein said movable means of said temporary stop device include an arm mounted for pivotal movement into and out of engagement with the arm member of said cartridge locking means, whereby upon movement of the pivotal arm of said temporary stop device into engagement with said arm member of said cartridge locking means, the last-mentioned arm member is moved against said biasing spring, causing said cartridge engaging means to apply a force against said cartridge sufficient to urge the cartridge away from said tape driving and information processing instrumentalities, said force being insufficient to move said cartridge out of said cartridge receiving tunnel.

3. A cartridge type tape player-recorder as claimed in claim 2 wherein said temporary stop device further includes a lever arm coupled to said pivotal arm, said lever arm movable from a released to a depressed position and vice versa to move said pivotal arm into and out of engagement with said arm member of said cartridge locking means, respectively, and means for securing said lever arm in said depressed position, said securing means being operable in response to the sidewise movement of said lever arm subsequent to the movement of said lever arm to the depressed position.

4. A cartridge type tape player-recorder comprising, in combination; a tunnel for receiving a tape cartridge, instrumentalities communicating with said tunnel including a rotatably driven capstan shaft for engaging and driving a recording tape through a cartridge inserted fully into said tunnel and a magnetic tape head for engaging and processing information on said tape, respectively, means actuable upon insertion of the cartridge into said tunnel to drive said capstan shaft and operates said magnetic tape head, a cartridge locking mechanism including a pivotal arm member movable from a first to a second stable position in response to the insertion of a cartridge into said tunnel, spring means connected to said pivotal arm member for resiliently biasing said pivotal arm member to said second position and cartridge engaging means coupled to said pivotal arm member for engaging said cartridge upon insertion of the latter into said tunnel, said cartridge locking mechanism maintaining said cartridge in said tunnel in engagement with said driving and information processing instrumentalities, and a temporary stop device mechanism for discontinuing momentarily the processing including the driving of the tape through the cartridge while not disturbing the operation of said instrumentalities, said temporary stop device mechanism comprising an arm mounted for movement between first and second positions, into and out of engagement with said pivotal arm member, respectively, when the latter is in the second stable position, the arm of said temporary stop device mechanism providing a force against said pivotal arm member and said spring means sufficient to cause said cartridge engaging means coupled thereto to urge said cartridge away from said driving and information processing intrumentalities, but insufficient to deactivate said capstan shaft and magnetic tape head operating means and to move said pivotal arm member to said first stable position, and an actuator mechanism coupled to the arm of said temporary stop device mechanism for moving said arm between said first and second position.

5. A cartride type tape player-recorder as claimed in claim 4 wherein said actuator mechanism comprises an arm member attached at a first end to said first-mentioned arm member and mounted for movement between first and second positions for moving said first-mentioned arm member between said first and second positions, respectively, and spring means biasing said last-mentioned arm member to said first position and means connected to said actuator arm member for releasably locking the latter arm member into said second position against the force of said biasing spring means.

6. A cartridge type tape player-recorder as claimed in claim 4 wherein the cartridge engaging means of said cartridge locking mechanism comprises a slide member including a portion positioned adjacent said cartridge for engagement therewith, the pivotal arm member of said cartridge locking mechanism being engageable with said slide member upon moving said actuator mechanism from said first to said second position thereby causing said slide member to urge said cartridge away from said tape driving and processing instrumentalities.

7. A cartridge type tape player-recorder comprising a tunnel for receiving tape cartridges therein, instrumentalities communicating with said tunnel for engaging and driving a tape through a cartridge inserted fully into said tunnel and for processing information on said tape, cartridge locking means including spring biased linkage means for engaging said cartridge upon the insertion of said cartridge into said tunnel to hold the same therein during the processing of information, and a pause mechanism for discontinuing momentarily the driving of the tape through the cartridge, said pause mechanism means eans actuable to move said linkage means against said spring bias to provide a force directed against said cartridge sufficient to move said tape out of engagement with said tape driving and information processing instrumentalities to discontinue said processing.

8. A cartridge type tape player-recorder as claimed in claim 7 wherein said actuable means includes an arm mounted for pivotal movement from a first position out of engagement with said linkage means of said cartridge locking means to a second position into engagement with said linkage means and wherein said pause mechanism includes a second, spring biased actuator arm connected at one end to said pivotal arm, whereby upon movement of said actuator arm, said pivotal arm member is moved into engagement with said linkage means of said cartridge locking means and upon release of said actuator arm said pivotal arm is returned to said first position.

9. A cartridge type tape player-recorder as claimed in claim 8 wherein said pause mechanism further includes means for releasably locking said pivotal arm into engagement with said linkage means of said cartridge locking means, said means being engageable with said second actuator arm upon moving the latter sidewise subsequent to the movement thereof into engagement with said linkage means.

* * * * *

UNITED STATES PATENT OFFICE
CERTIFICATE OF CORRECTION

Patent No. 3,800,320 Dated March 26, 1974

Inventor(s) HAJIME MURAKAMI

It is certified that error appears in the above-identified patent and that said Letters Patent are hereby corrected as shown below:

On the cover sheet, insert -- [30] Claims Foreign Priority Data Japan 46/10315 Feb. 22, 1971 -- .

Signed and sealed this 13th day of August 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.